United States Patent [19]

Clark

[11] Patent Number: 5,001,776

[45] Date of Patent: Mar. 19, 1991

[54] COMMUNICATION SYSTEM WITH ADAPTIVE TRANSCEIVERS TO CONTROL INTERMODULATION DISTORTION

[75] Inventor: Edward T. Clark, Plantation, Fla.

[73] Assignee: Motorola Inc., Schaumburg, Ill.

[21] Appl. No.: 263,146

[22] Filed: Oct. 27, 1988

[51] Int. Cl.⁵ .............................................. H04B 1/26
[52] U.S. Cl. ..................................... 455/226; 455/236; 455/234; 455/343; 455/308
[58] Field of Search ............... 455/295, 296, 308, 309, 455/310, 311, 255, 256, 264, 235, 236, 343, 226, 67, 68, 88

[56] References Cited

U.S. PATENT DOCUMENTS

| | | | |
|---|---|---|---|
| 4,352,208 | 9/1982 | Schroeder | 455/266 |
| 4,485,403 | 11/1984 | Illetschko | 455/296 |
| 4,691,382 | 9/1987 | Nakajima | 455/343 |
| 4,761,646 | 8/1988 | Choquet et al. | 370/13 |
| 4,907,293 | 3/1990 | Veno | 455/295 |

Primary Examiner—Reinhard J. Eisenzopf
Assistant Examiner—Edward Urban
Attorney, Agent, or Firm—Pablo Meles

[57] ABSTRACT

A transceiver determines the signal quality of a desired signal and the strength of all received signals. When the signal quality of the desired signal is low, and the signal strength of all received signals is high, the receiver is adapted to operate in a higher current mode, thereby minimizing intermodulation distortion. Conversely, when the quality of the desired signal is low and the strength of all received signals is also low, or when the quality of the desired signal is above a threshold, the receiver operates in a lower current mode to conserve power and maximize battery lifetime. Also, when the transceiver adapts to operate in the higher current mode, a command is sent instructing a transmitting party to increase the quality of their message which may enable the listening transceiver to adapt (return) to a lower current mode.

17 Claims, 2 Drawing Sheets

COMMUNICATION SYSTEM WITH ADAPTIVE TRANSCEIVERS TO CONTROL INTERMODULATION DISTORTION

TECHNICAL FIELD

This invention relates generally to radio frequency (RF) transceivers, and more specifically to RF tranceivers designed to conserve a battery power source, and is particularly directed toward adapting the power consumption of battery powered RF transceivers to control intermodulation distortion while maximizing the operational lifetime of the tranceiver's battery.

BACKGROUND ART

In an RF receiver, intermodulation distortion is caused by an interfering signal of sufficient signal strength mixing with a local oscillator (or injection) signal that results in an undesired signal appearing in the passboard of a receiver's intermediate frequency (IF) section. Generally, a desired signal is also mixed into the IF passboard, and the comtemporaneous presence of the undesired signal distorts the desired signal thereby reducing the intelligibilty of the desired signal.

It is known that the third order IM distortion of a balanced commutation mixer may be represent by:

$$IM \alpha \left( t_r \times f_{lo} \frac{V_s}{V_c} \right)^2 \quad (1)$$

Where,
IM is the third order intermodulation distortion;
$V_c$ is the peak-to-peak local oscillator voltage;
$V_s$ is the peak received signal voltage;
$t_r$ is the rise (and fall) time of $V_c$; and
$f_{lo}$ is the frequency of the local oscillator.

As is known, the peak received signal voltage ($V_s$) may be viewed as a random parameter, and the frequency of the local oscillator ($f_{lo}$) is typically determined by the frequency of the desired signal Accordingly, for a given received signal level and frequency, analysis of equation (1) reveals that the IM of the mixer (and thus the receiver) may be minimized (theoretically to zero) by increasing the peak-to-peak local oscillator voltage ($V_c$), or by reducing the rise (and fall) time of the local oscillator waveform ($t_r$), such as by using a square wave. However, signal amplification and square wave generation require high current to enable active devices to operate at high speed. Thus, this practice may be detrimental to battery powered RF receivers since the radio's operational lifetime may be reduced to an impractically short interval. Conversely, merely adding more batteries (or cells) to an RF receiver may so increase the weight and physical size of the receiver as to make it undesirable to the comsuming public.

SUMMARY OF THE INVENTION

Accordingly, it is an object of the present invention to provide an Rf communication system transceiving devices capable of adapting their operation to minimize intermodulation distortion.

Briefly, according to the invention, a receiver (or the receiving section of a transceiver) determines the signal quality of a desired signal, and the combined strength of all received signals (i.e., both desired and interfering signals). When the signal quality of the desired signal is low, and the combined signal strength of all received signals is high (indicating a strong interfering signal), the receiver is adapted to operate in a higher current mode, which minimizes intermodulation distortion. Conversely, when the quality of the desired signal is low and the combined strength of all received signals is also low, or when the quality of the desired signal is above a threshold, the receiver operates in a lower current mode to conserve power and maximize battery lifetime.

In another embodiment of the present invention, a transceiver operates as described above to determines the quality of a desired signal and the combined strength of all received signals. When the transceiver adapts to operator in the higher current mode, a command is sent instructing the transmitting party to increase the quality of the transmitted message, such as, by increasing transmitter power, adding error correction information to the transmitted message, or decreasing the transmssion rate. By increasing the quality fo the transmitted message, the signal quality of the desired signal may increase to the point where the transceiver may adapt (return) to the lower current mode.

DETAILED DESCRIPTION OF THE PREFERRED EMBODIMENT

Figure 1:
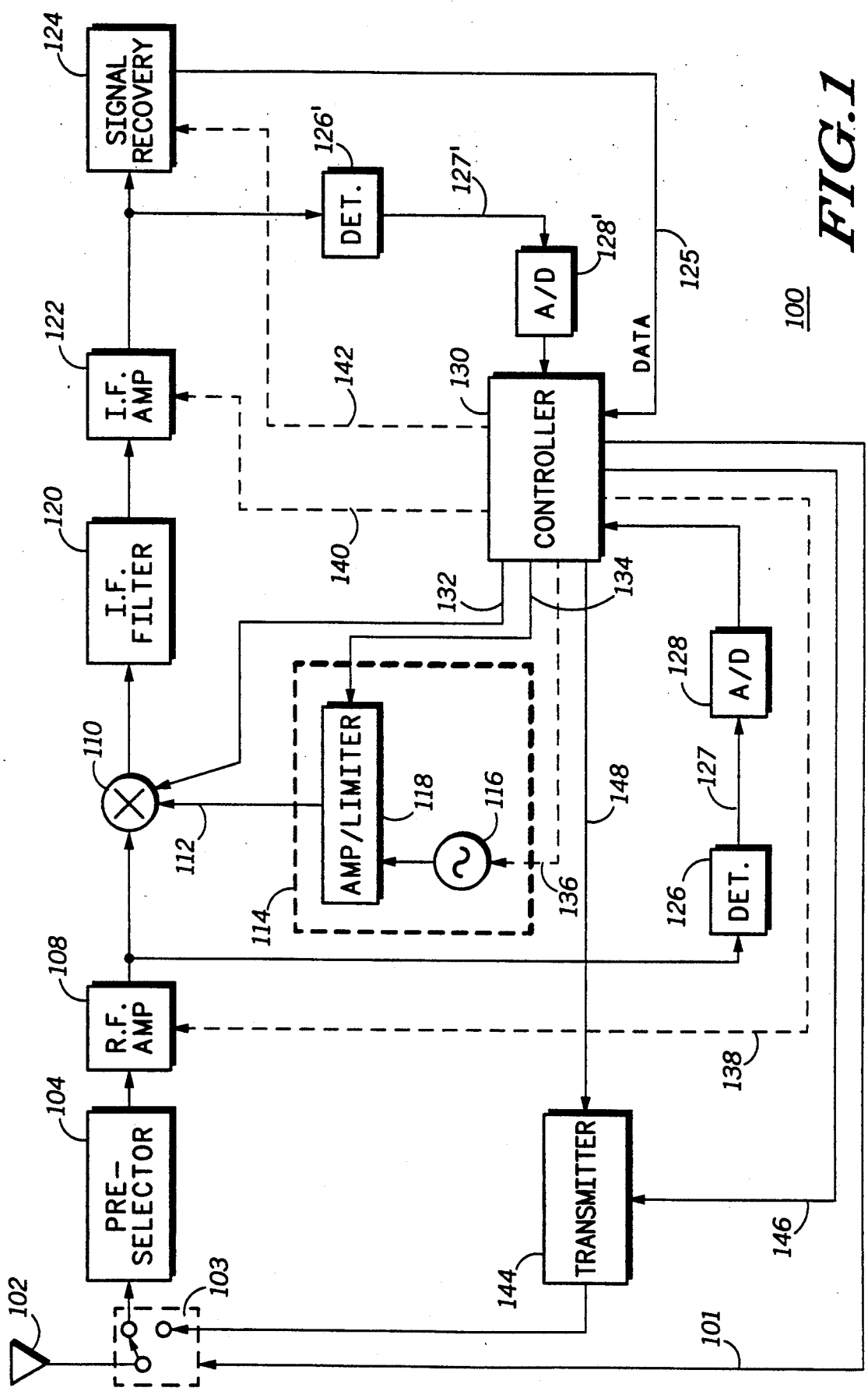
FIG. 1 is a block diagram of a transceiver in accordance with the present invention.

Referring to FIG. 1, a block diagram of a transceiver 100 in accordance with the present invention is shown. Operationally, signals received by an antenna 102 are directed via an antenna switch 103 to a pre-selector 104, which appropriately band-limits the frequency spectrum of the transceiver 100. The signals residing in the band-limited spectrum provided by the pre-selector 104 may be amplified in a radio frequency (RF) amplifier 108, the output of which is routed to a mixer 110. As a second input, the mixer 110 accepts an injection signal 112 provided by a local oscillator 114. The local oscillator 114 comprises and oscillattor 116, which may be a VXCO or other source of suitable stability. The oscillator 116 is coupled to an amplifier/limiter 118, which controls the peak-to-peak voltage of the injection signal 112. By controlling the amplifier/limiter 118, the injection signal may be provided in the form of a square wave so that the rise (and fall) time of the injection signal 112 is minimized.

The output of the mixer 110 comprises an intermediate frequency (IF) signal, which is further filtered in an IF filter 120 the band-width of which determines the received signals that will be processed to recover a desired information signal (either data or voice). Typically, the filtered IF signal is amplified in an intermediate frequency amplfier 122, prior to being routed to a signal recovery section 124. The signal recovery section 124 may comprise a demodulator of conventional design for recovering voice messages, and may further comprise any suitable data detector for recovering data messages, which are routed (via data line 125) to a controller 130.

According to the invention, a "front end" signal detector 126, is coupled to the output of the RF amplifier 108, and operates to provide a DC output voltage signal 127 that varies in proportion to the signal strength of all received signals (i.e., both desired signals and interfering signals). The signal detector 126 is referred to herein as a "front end" detector since it operates before the IF section (i.e., the IF filter 120 and the IF amplifier 122) of the transceiver 100. Additionally, a "back end" signal detector 126' is coupled to the output of the IF amplifier 122, and operates to provide a DC output voltage signal 127' that varies in proportion to the signal quality of a desired signal. According to the invention, the quality parameter of the desired signal monitored by the detector 126' preferably comprises received signal strength for voice signals, and bit error rate (BER) for data signals, but may also comprise signal-to-noise ratios, intersymbol interference measurements, or other such parameters used to relate or connote signal quality. The signal detector 126' is referred to herein as a "back end" detector since it operates after the IF section (i.e., the filter 120 and the IF amplifier 122) of the transceiver 100. Such signal detectors are well known in the art and any suitable implementation of a signal detector capable of providing a signal strength indicator (127 or 127') may be used in conjunction with the present invention.

The signal strength indicators 127 and 127' are digitized vai an analog-to-digit (A/D) convertors (128 and 128' respectively) prior to being routed to a controller 130. The controller 130 compares the digital representation of the received signal strength (127) and the desired signal quality (127') to at least one threshold to determine whether the received signal contains an interfering signal capable of promoting intermodulation distortion of the desired signal. So long as the quality of the desired signal is high, the transceiver 100 operates in a lower current mode so as to conserve power. Conversely, when the quality of the desired signal is low, the signal strength of the "front end" received signals is examined. A weak "front end" signal indicates the absence of any significant interfering signal, while a strong "frone end" signal strength indicates the presence of a strong interfering signal capable of promoting intermodulation distortion of the known low quality desired signal. According to the invention, the transceiver 100 operates to adapt to a higher current operating mode in the presence of a poor (or low) quality desired signal and a strong "front end" signal strength as indicated below in Table 1. Optionally, when both the "front end" signal strength and the "back end" signal quality are high, the high current mode may be more desirable than the low current mode for some applications.

TABLE 1

| Desired Signal Quality | Received Signal Strength | Operating Mode |
| --- | --- | --- |
| Low | Low | Low Current |
| Low | High | High Current |
| High | Low | Low Current |
| High | High | Low Current |

To minimize intermodulation distortion, the controller 130 of the transceiver 100 operates to adapt at least the peak-to-peak voltage of the injection 112 by controlling (via a control line 134) the amplifier/limiter 118. Depending upon the command of the controller 130, the amplifier/limiter 118 increases the peak-to-peak voltage of the injection signal 112 to a suitable level, and may generate a large amplitude square wave so as to further minimize IM distortion. Additionally, the controller 130 may vary (via a control line 132) the current consumption of the mixer 110 to enable switching transistors and other circuits to operate at an increased speed or enhanced performance, which also reduces IM distortion.

According to the invention, the Rf transceiver 100 is preferably a battery powered device. Thus, it will be appreciated that the gain achieved by the present invention in reducing IM distortion is not without cost. As previously mentioned, the injection signal modifications, the mixer switching speed adaptions, and other performance enhancements made to minimize IM distortion require high current. Accordingly, prolonged operation in a high current mode may cause the battery of the transceiver 100 to be prematurely exhausted. Thus, the present invention operates to balance current drain and battery life against signal distortion and message intelligibility. This balance is achieved and maintained by the controller 130 as it compares the "back end" signal quality and the "front end" signal strength against thresholds selected to correspond to varying degrees of desired signal intelligibility. So long as the desired signal quality remains sufficiently high, the transceiver 100 may operate in a lower power mode to conserve power. However, as the quality of the desired signal falls, the injection signal 112 may be adjusted to counteract any distorting effects that a strong interfering signal may cause. Conversely, for interfering signals with lower signal strength, certain degradations in the desired signal's intelligibly may be permitted in favor of increased battery life.

Optionally, the controller 130 may adapt additional parameters when adapting between a lower current and a higher current mode. For example, the oscillator 116 may be shut down or its operation appreciably slowed (via the control line 136). Also, the amplification factors (and thus the current drain) of the RF amplifier 108 and the IF amplifier 122 may be varied (via control lines 138 and 140 respectively) by the controller 130. Finally, the controller 130 may shut down (or slow down) certain stages of the signal recovery section 124 (via a control line 142), such as, digital signalling processors (DSP) or other circuits known to consume large amounts of current.

In another embodiment of the present invention, the transceiver 100 operates to coupler (101) a transmitter 144 to the antenna 102 and send a command to other tranceiver's when adapting to operate in the higher current mode. That is, the signal quality of the desired signal is typically associated with another transceiver that is also a party to a conversation in progress. When the received signal strength (both desired and interfering signals) is high, and desired signal quality is low, the listening transceiver adapts to a higher current mode as discussed above to minimize IM distortion. Additionally however, the listening transceiver may send a command code to the transmitting transceiver that instructs the transmitting transceiver to increase the quality of its signal. This may be accomplished by increasing the transmitter power (via control line 146), adding error correction codes to the signal (via data line 148), or slowing the transmission rate (via control line 146). The purpose of this exchange is to cause the quality of the desired signal at the listening transceiver to increase to a point where the listening transceiver may adapt (return) to the lower current mode and conserve battery power.

Figure 2:
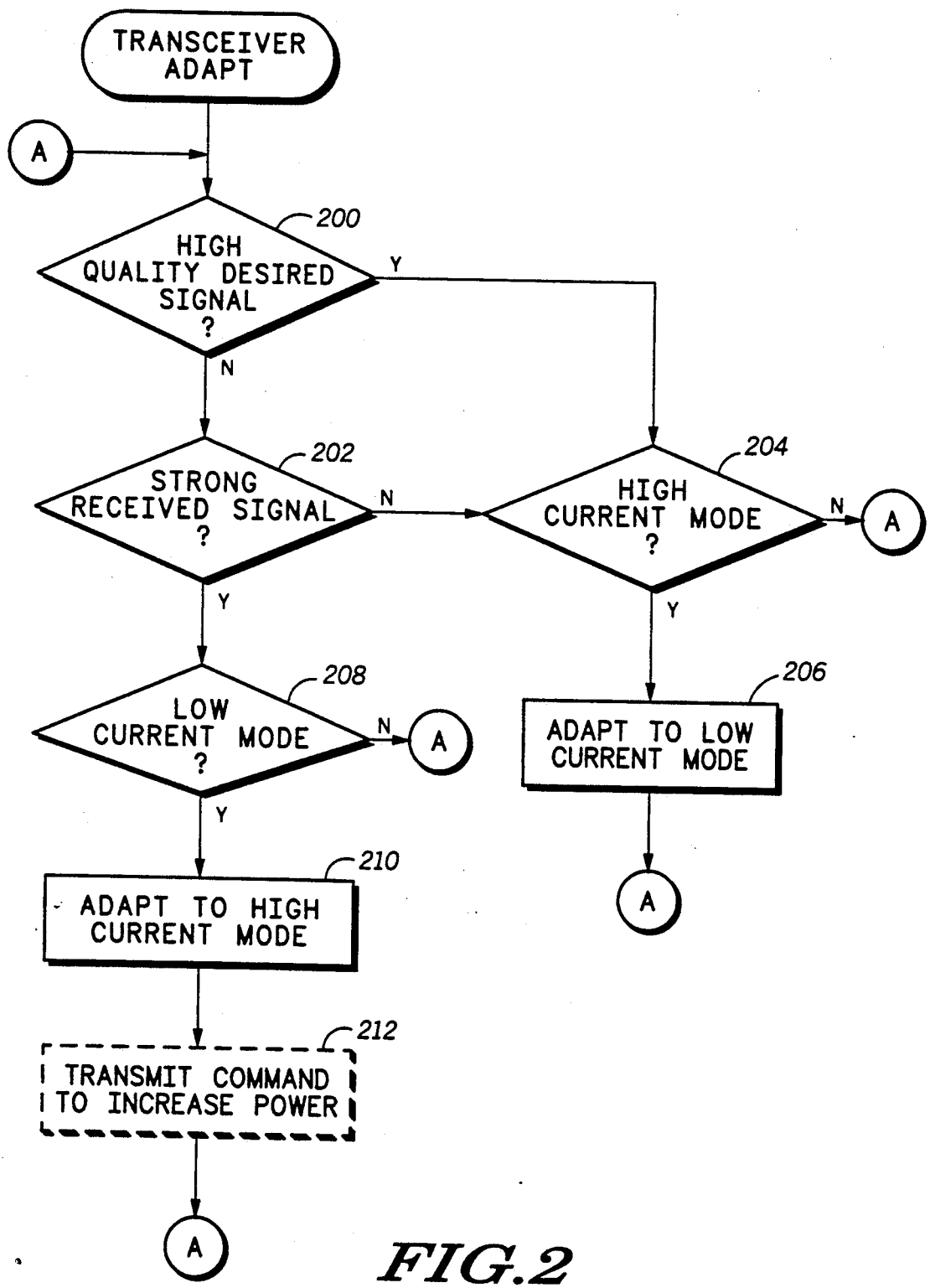
FIG. 2 is a flow diagram illustrating the steps executed by the transceiver of FIG. 1 in accordance with the present invention.

Referring to FIG. 2, a flow diagram illustrating the steps executed by the transceiver 100 is shown. The routine begins in decision 200, which determines whether the quality of the desired signal is sufficiently high. If the determination of decision 200 is that a low quality desired signal has been received, the routine proceeds to decision 202, which determines whether the strength of all received signal (both desired and interfering) at least equal to (or exceeds) a threshold. A negative determination of either decision 200 or decision 202 routes control to decision 204, which determines whether the transceiver 100 is currently operating in a higher current mode (i.e., adapting to minimize IM distortion). If not, the routine proceeds to reference letter A (decision 200). However, if the determination of decision 204 is that the transceiver is currently operating in the high current mode, the routine proceeds to step 206, which adapts the receiver from the higher current mode to a lower current mode thereby conserving battery power.

Assuming, however, that the determination of decision 202 is that the strength of the "front end" signal is above the threshold, and thus likely to increase intermodulation distortion (due to the low quality of the desired signal), the routine proceeds to decision 208, which determines whether the transceiver 100 is currently oerating in the lower current mode. If so, the routine proceeds to step 210, which adapts the receiver to a higher current mode, including, at least adapting the injection signal 112. Optionally, amplification factors of the RF amplifier 108 and the IF amplifier 122 may be varied when adapting from the higher current mode to the lower current mode, and also within either the higher or lower current modes to provide a fine adjustment. Finally, one or more stages of the signal recover section 124 may be provided with more or less current drive to vary their performance thereby facilitating recovery of the desired information signal, while conserving battery power.

Optionally, the transceiver may transmit a command to another transceiver to increase the quality of its signal (step 212). Following this, the routine returns to decision 200, which again determines the quality of the desired signal. If the quality of the desired signal has sufficiently improved, the routine proceeds through decision 204 to step 206, which adapts (returns) the transceiver to the lower power mode. In this way, each tranceiver operating within the communication system cooperates to minimize intermodulation distortion.

What is claimed is:

1. In a two-way radio frequency communication system having at least two transceiving devices, a method for receiving an information signal that may be corrupted by an interfering signal, comprising the steps of: in at least one transceiving device:
   (a) receiving a signal to provide a received signal comprising at least a desired signal;
   (ai) mixing the received signal with an injection signal to provide a mixed signal;
   (b) determining whether said desired signal has a signal quality above a first threshold after the received signal has been mixed;
   (c) determining whether said received signal has a signal strength above a second threshold before the received signal is mixed; and
   (d) controlling intermodulation distortion by adjusting at least said injection signal when said signal quality of said desired signal is below said first threshold and said strength of said received signal is above said second threshold:
   (e) transmitting a command code when said signal quality of said desired signal is below said first threshold and said strength of said received signal is above said second threshold:
   (f) determining whether said desired signal has a signal quality above a first threshold:
   (g) adjusting at least said injection signal when said signal quality of said desired signal is above said first threshold.

2. The method of claim 1, wherein step (d) comprises increasing peak voltage of said injection signal when said signal quality of said desired signal is below said first threshold and said signal strength of said received signal is above said second threshold.

3. The method of claim 2, wherein step (d) further comprises reducing rise time of said injection signal when said signal quality of said desired signal is below said first threshold and said signal strength of said received signal is above said second threshold.

4. The method of claim 1, wherein step (d) comprises reducing rise time of said injection signal when said signal quality of said desired signal is below said first threshold and said signal strength of said received signal is above said second threshold.

5. The method of claim 1, wherein step (d) comprise adjusting at least a portion of said receiver to operate in a higher current mode when said signal quality of said desired signal is below said first threshold and said signal strength of said received signal is above said second threshold.

6. The method of claim 5, wherein step (d) further comprises adjusting said receiver to operate in a lower current mode when said signal quality of said desired signal is above said first threshold.

7. In a two-way frequency communication system having at least two transceiving devices, a method for receiving an information signal in the presence of an interfering signal, comprising the step of: in a first one transceiving device:
   (a) a receiving a signal to provide a received signal comprising at least a desired signal;
   (b) determining whether said received signal has a signal strength above a second threshold before mixing an injection signal with said received signal;
   (c) determing whether said desired signal has a signal quality above a first threshold after mixing said injection signal with said signal; and,
   (d) controlling intermodulation distortion by adjusting at least said injection signal when said signal quality of said desired signal is below said first threshold and said signal strength of said received signal is above said second threshold:
   (e) transmitting a command code when said signal quality of said desired signal is below said first threshold and said strength of said received signal is above said second threshold:
   (f) determining whether said desired signal has a signal above a first threshold:
   (g) adjusting at least said injection signal when said signal quailty of said desired signal is above said first threshold: at a second transceiving device:
   (a) transmitting said desired signal: p1 (b) receiving said command code:
   (c) adjusting said second transceiving device and/or said desired signal in response to receiving said command code: and
   (d) transmitting said desired signal.

8. The method of claim 7, wherein step d further comprises adjusting at least a portion of said receiver to operate in a higher current mode when said signal quality of said desired signal is below said first threshold and said signal strength of said received signal is above said second threshold.

9. The method of claim 7, wherein step (e) further comprises adjusting said receiver to operate in a lower current mode when said said signal quality of said desired signal is below said first threshold and said signal strength of said received signal is above said second threshold.

10. In a two-way radio frequency communication system having at least two battery powered transceiving devices having at least one converter capable of mixing a received signal with an injection signal to facilitate recovery of an information signal, a method for controlling intermodulation distortion in the battery powered transceiving devices comprising the steps of: in a first transceiving device:
(a) receiving a signal to provide a received signal comprising at least a desired signal;
(b) determining whether said desired signal has a signal quality above a first threshold after mixing said received signal with an injection signal;
(c) determining whether said received signal has a signal strength above a second threshold before mixing said received signal with said injection signal; and
(d) controlling intermodulation distortion by adjusting at least said injection signal when said signal quality of said desired signal is below said first threshold and said signal strength of said received signal is above said second threshold;
(e) transmitting a command code when said signal quality of said desired signal is below said first threshold and said signal strength of said received signal is above said second threshold;
(f) determining whether said desired signal has a signal quality above a first threshold;
(g) adjusting at least said injection signal when said signal quality of said desired signal is above said first threshold; at a second transceiving device:
(a) transmitting said desired signal;
(b) receiving said command code;
(c) adjusting said second transceiving device and/or said desired signal in reponse to recieving said command code; and,
(d) transmitting said desired signal.

11. A radio frequency transceiving device capable of receiving an information signal that may be corrupted by an interfering signal, comprising:
means for receiving a signal to provide a received signal comprising at least a desired signal;
means for filtering said received signal to substantially provide said desired signal;
means for determining whether said desired signal has a signal quality above a first threshold after the received signal is filtered to provide said desired signal;
means for determining whether said received signal has a signal strength above a second threshold before the received signal is filtered to provide said desired signal; and,
means for controlling intermodulation distortion by adjusting at least an injection signal when said signal quality of said desired signal is below said first threshold and said signal strength of said received signal is above said second threshold; and,
means for transmitting a command code when said signal quality of said desired signal is below said first threshold and said signal strength of said received signal is above said second threshold.

12. The radio frequency receiver of claim 11, wherein said means for controlling comprises means for increasing peak voltage of said injection signal quality of said desired signal is below said first threshold and said signal strength of said received signal is above said second threshold.

13. The radio frequency receiver of claim 12, wherein said means for controlling further comprises means for reducing rise time of said injection signal when said signal quality of said desired signal is below said first threshold and said signal strength of said received siganal is above said second threshold.

14. The radio frequency receiver of claim 11, wherein said means for controlling further comprises means for reducing rise time of said injection signal when said signal of said desired signal is below said first threshold and said signal strength of said received siganal is above said second threshold 15. The radio frequency receiver of claim 11, which includes means for adjusting at least a portion of said receiver to operate in a higher current mode when said signal quality of said desired signal is below said first threshold and said signal strength of said received signal is above said second threshold.

16. The radio frequency receiver of claim 15, which includes means for adjusting said receiver to operate in a lower current mode when said signal quality of said desired signal is above said first threshold, 17. A battery powered radio frequency transceiver for use in a two-way radio frequency communication system having at least two of said battery powered radio frequency transceivers each having at least one convertor for receiving an injection signal and a received signal to facilitate recovery of an information signal that may be corrupted by an interfering signal, and each of said at least two battery powered radio frequency transceivers being capable of controlling intermodulation distortion by adjusting between a low current mode and a high current mode which includes adjusting at least the peak voltage and rise time of said injection signal, said battery powered radio frequency transceiver comprising:
a battery source;
means for receiving a signal to provide a received signal comprising at least a desired signal;
means for mixing said received signal to substantially provide said desired signal;
means for determining whether said desired signal has a signal quality above a first threshold after mixing said received signal;
means for determining whether said received signal has a signal strength above a second threshold before mixing said received signal; and,
means for controlling intermodulation distortion by adjusting at least an injection signal when said signal quality of said desired signal is below said first threshold and said signal strength of said received signal is above said second threshold; and,
means for transmitting a command code when said signal quality of said desired signal is below said first threshold and said signal strength of said received signal is above said second threshold.

* * * * *